United States Patent [19]

Haws

[11] 3,815,177

[45] June 11, 1974

[54] METHOD AND APPARATUS FOR REMOVING HIDES FROM ANIMAL CARCASSES

[75] Inventor: Melburn W. Haws, Davis, Calif.

[73] Assignee: Armour and Company, Phoenix, Ariz.

[22] Filed: Feb. 10, 1972

[21] Appl. No.: 225,236

[52] U.S. Cl. .................................... 17/50, 17/21
[51] Int. Cl. ........................................ A22c 21/00
[58] Field of Search ................................ 17/50, 21

[56] References Cited
UNITED STATES PATENTS
2,494,138  1/1950  De Moss .......................... 17/50 X
3,404,431  10/1968  Knauss .............................. 17/50
3,683,455  8/1972  Anderson .......................... 17/50

Primary Examiner—Louis G. Mancene
Assistant Examiner—D. L. Weinhold
Attorney, Agent, or Firm—Frank T. Barber; Carl C. Batz

[57] ABSTRACT

A method for removing the hide from animal carcasses in which the animal carcass is suspended on a conveyor and the end portion of the hide is loosened and put over a stationary holder and held in contact with this holder while a roller is pressed downwardly against the hide between the stationary holder and the carcass. The invention also refers to apparatus which includes a chain to which outwardly extending arms are attached. On operation the arms descend to push the rollers downwardly against the hide.

3 Claims, 5 Drawing Figures

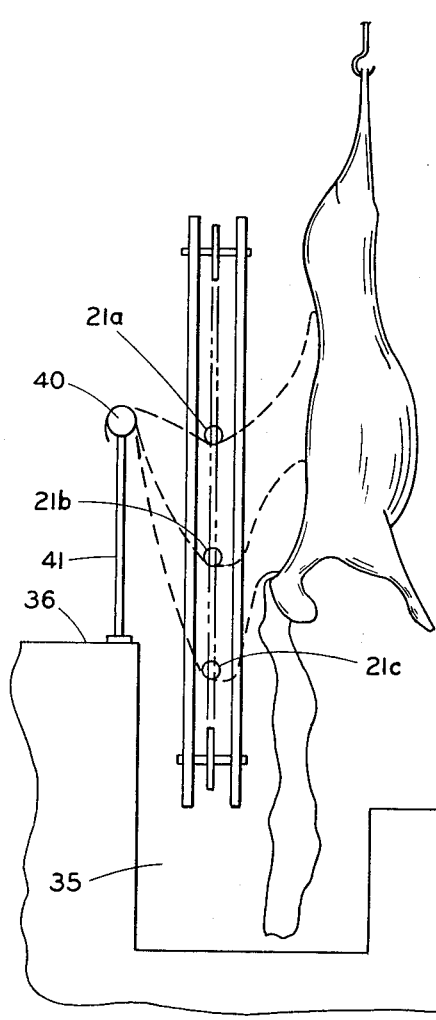
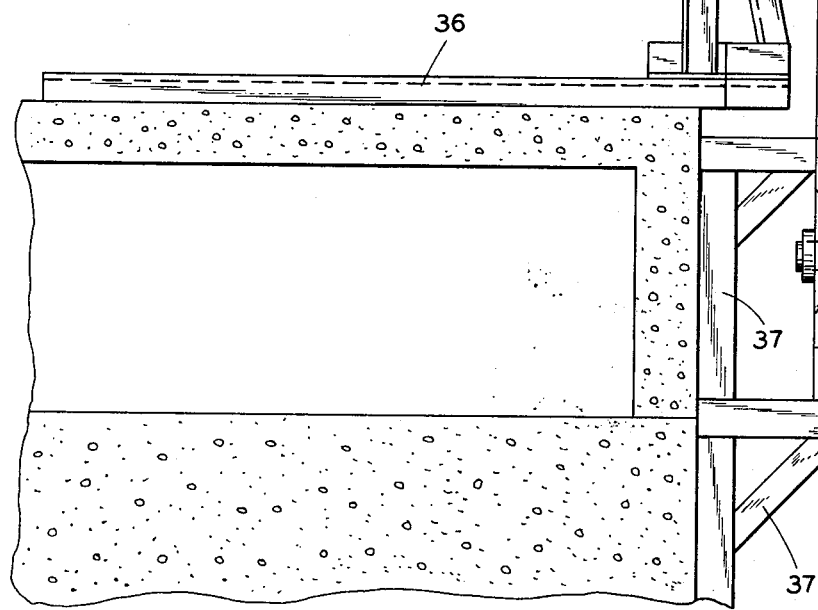
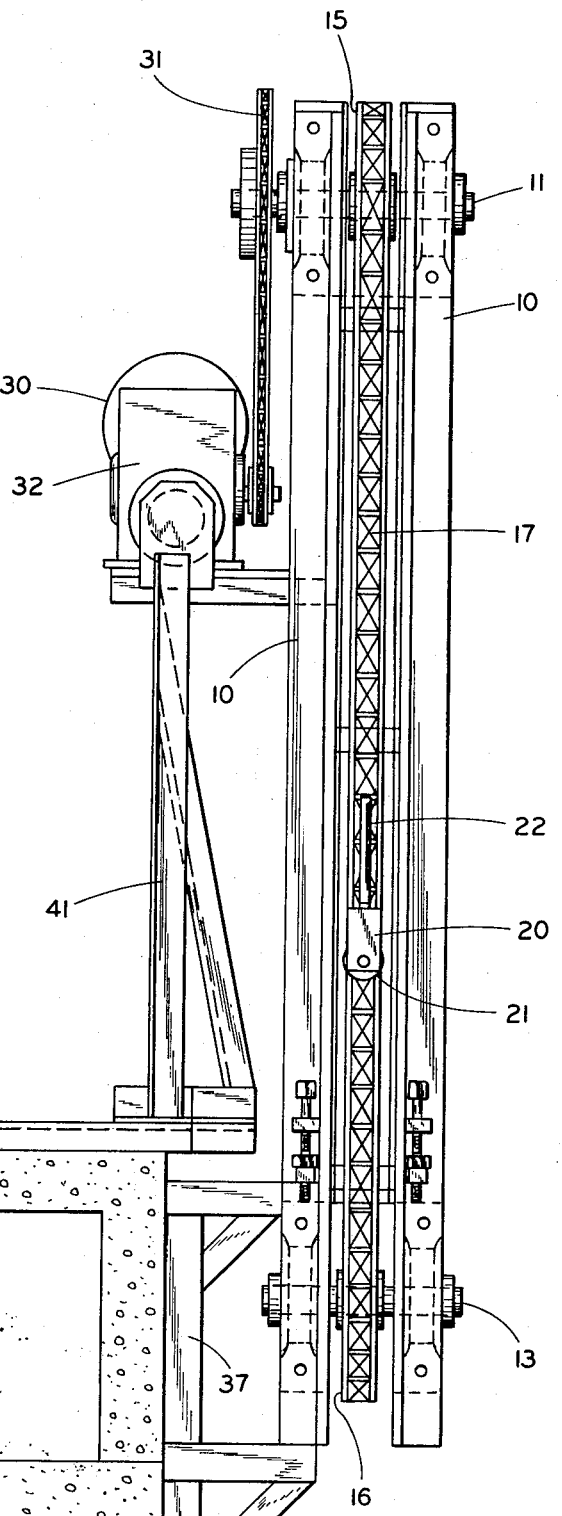

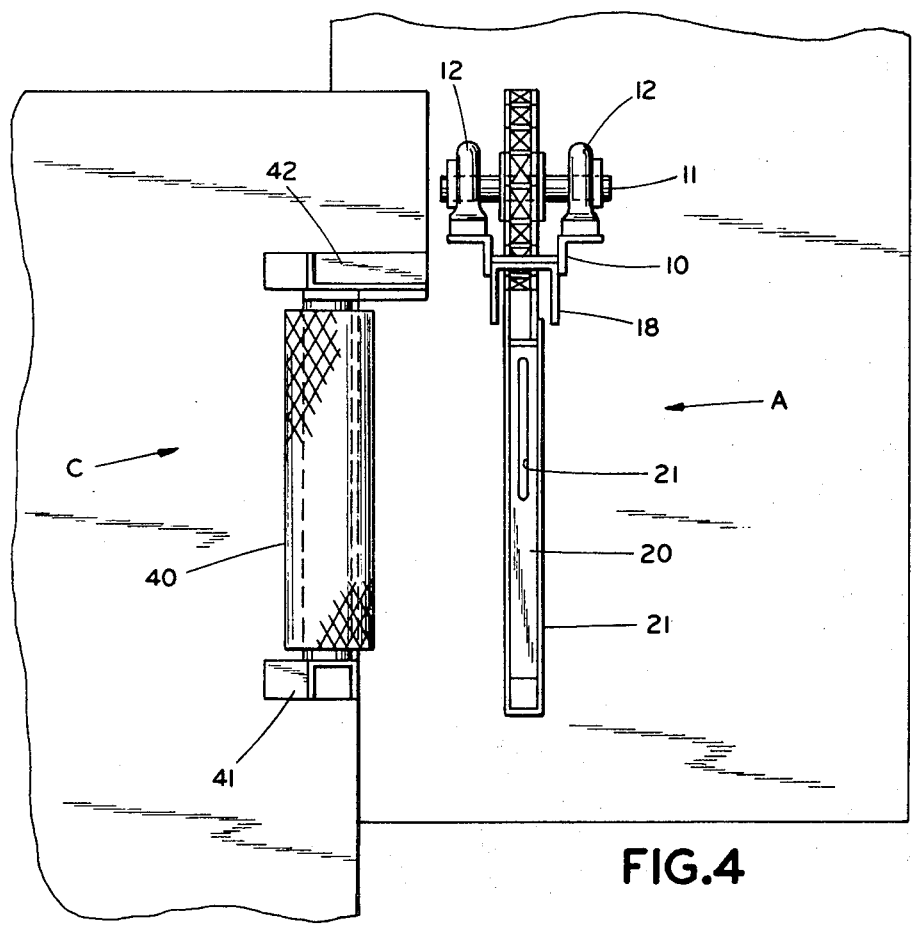
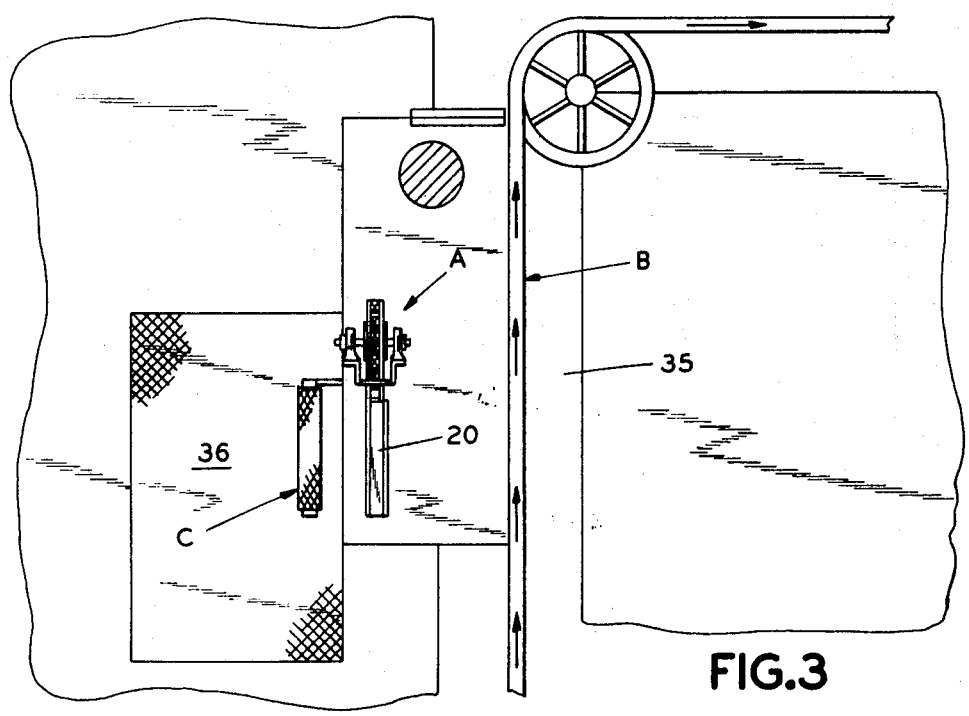
FIG.4
FIG.3

METHOD AND APPARATUS FOR REMOVING HIDES FROM ANIMAL CARCASSES

SUMMARY

This invention relates to a hide or pelt pulling device for use in animal slaughtering operations and also to a method of pulling pelts from animal carcasses, particularly sheep or lambs.

BACKGROUND

The removal of the skins or pelts from animal carcasses such as sheep or lambs has involved a great amount of hand work, and attempts to provide hide pulling devices for this operation have heretofore not met with any great success. One reason for this is that these pelts, and especially the pelts of lambs, are more fragile and clamps do not hold well; also the hides themselves are tender and subject to tearing when put under strain.

Therefore, in packing house operations it has been customary to skin the sheep or lambs by hand, using ordinary skinning knives.

In the regular slaughtering operation the animals are killed and their carcasses suspended by the hind legs on an overhead conveyor, and the suspended carcasses are passed by a number of skinning stations where at each station a man does a particular skinning job. The sequence of skinning the different parts of the carcass may vary somewhat but usually the skinning operation begins at the hind shank, then comes the skinning of the legs and buttocks. The hide may be slit down the belly of the animal carcass, and this followed by skinning of the hind quarters, the fore quarters and finally the neck and head portions of the animal carcass. All of this requires that many men take part in the skinning operation, with each man being required to have a highly developed skill for the particular task which he performs.

It would be very desirable if a large part of the skinning function in a slaughter house operation could be taken over by automatic means, thus to relieve the need for so many workers in a somewhat unpleasant environment, and also to save the cost and expense of human labor.

Accordingly, it is an object of this invention to provide a method for conducting the skinning of animal carcasses, particularly the carcasses of sheep and lambs, which will efficiently and effectively remove the hides or pelts without damage and with a minimum of human labor.

It is also an object of the invention to provide a device for pulling the hides or pelts particularly from the carcases of sheep or lambs without tearing or injuring the hides or the flesh of the animal.

A further object is to provide a method and apparatus for effectively pulling the hides of animal carcasses and accomplishing the purposes above referred to in a sanitary manner without contamination of the flesh of the animal.

Other objects and advantages of the invention will become apparent as this specification proceeds.

DRAWINGS

One embodiment of the invention is illustrated in the accompanying drawings, in which FIG. 1 is a view of the improved device in side elevation;

FIG. 2 is a view of the device in elevation taken from a plane at right angles from the plane of FIG. 1;

FIG. 3 is a plan view showing the general layout and particularly the relation of the conveyor to the hide holding apparatus and the pressing mechanism;

FIG. 4 is an enlarged plan view showing in more detail the relation of the holding device to the pressing mechanism; and FIG. 5 is a view in elevation showing schematically the operation of the device in the removal of a hide from an animal carcass.

DETAILED DESCRIPTION

Figure 1:
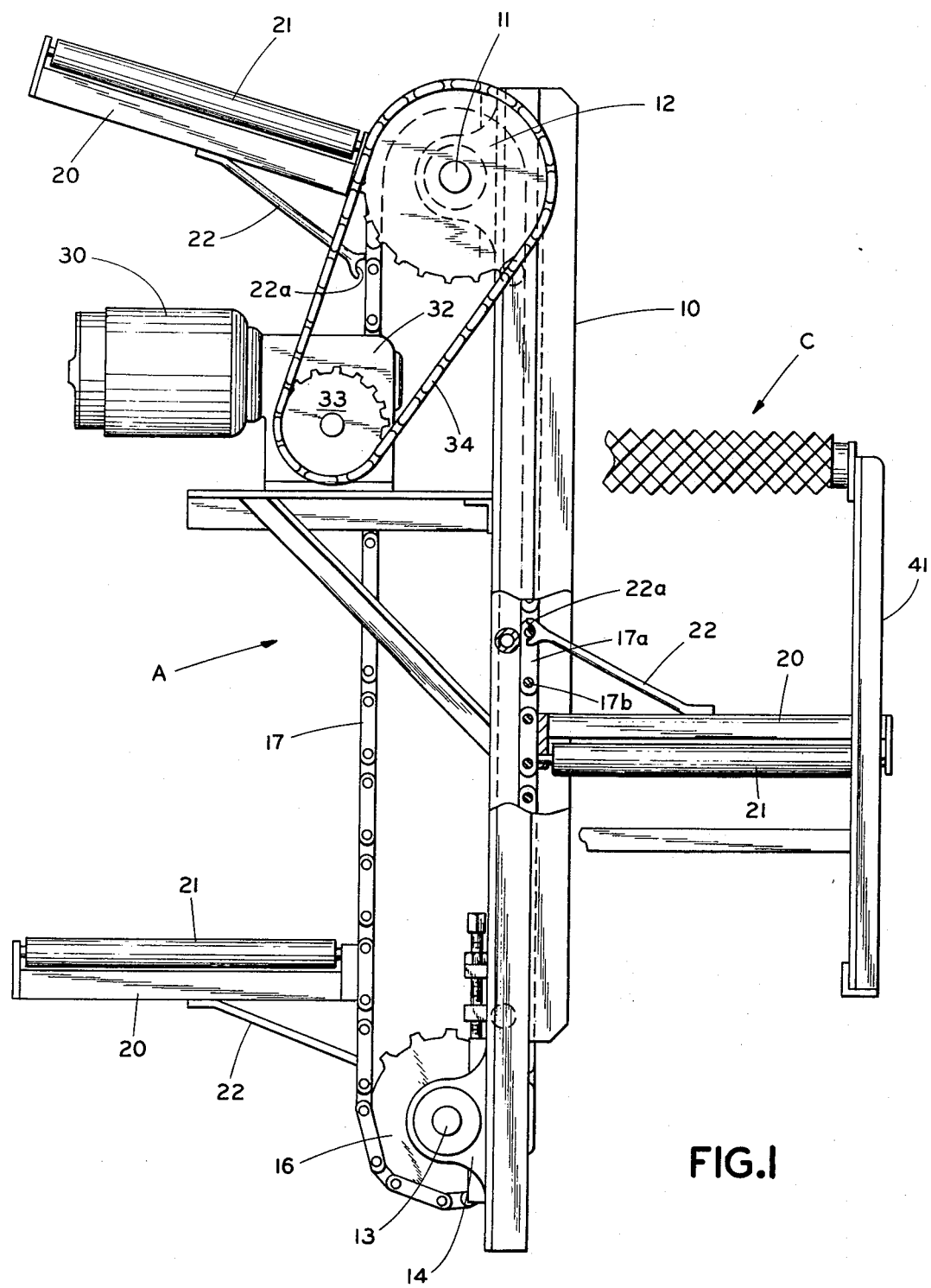

As illustrated, my improved apparatus includes an automatic pressing device A which is intended to be set up beside an overhead conveyor B on which the carcasses are suspended, and includes also a stationary holder C against which an operator may press a portion of the hide of the carcass.

In carrying out my improved process, an operator may start by skinning a portion of the hide from a carcass suspended on a conveyor, place this portion over the holder, and utilize the automatic pressing device to press the hide between the holder and the carcass to thus remove remaining portions of hide.

Referring to the apparatus as shown particularly in FIGS. 1 and 2, the pressing device A has a frame 10. At the upper portion of the frame the shaft 11 is rotatably carried in bearings 12, and at the lower portion of the frame shaft 13 is rotatably carried by bearings 14. Sprocket wheel 15 is secured on shaft 11 at the top and sprocket wheel 16 is secured on shaft 13 at the bottom. About these sprocket wheels is the continuous chain 17. Chain 17 is formed of the side links 17a which are joined by the chain bushings 17b. The guide members 18 are attached to the frame and disposed along the inside surface of the chain so as to help keep the vertical span of the chain in alignment on the downwardly moving side of the chain.

Mounted on chain 17 at spaced intervals about the chain are the arms 20. One end of these arms is secured to the chain and the arm extends outwardly from the chain perpendicularly with the vertical spans of the chain or radially with respect to sprockets 15 and 16. These arms are carried upwardly on the upwardly moving part of the chain, which is the left hand side as seen in FIG. 1, then over at the top around sprocket 15 and downwardly on the downwardly moving part of the chain, which is the right hand side as seen in FIG. 1. At the top part of the arms 20 as they are moving upwardly on the left hand side and on the bottom part of the arms as they are moving downwardly on the right hand side are the rollers 21. These rollers are pivotally mounted at their ends within the arms 20, and are free to rotate.

Each of arms 20 is further provided with a brace 22 which at its one end is secured to the arm and which has its other end free and forked in shape so that this end of the brace can engage a bearing 17b on chain 17 during upward travel of the arm so as to help support the weight of the arm. However, the principal function of the braces 22 takes place during the downward travel of the arm when the roller comes into contact with the hide and is so pressed upwardly. Upward pressure against the arm causes the free end of the brace 22 to engage the chain and so maintain the arm in its horizontal position during the downward pressing of the hide. By having its one end free to separate from the chain as the arm goes around the sprocket this structure serves to permit the chain to pass about the sprockets 15 and 16 without binding, and yet support the arms during their upward and downward travel in a vertical direction.

For driving chain 17 I provide the motor 30 which is supported on table 32 which is attached to frame 10. A sprocket 31 is secured to the inner side of shaft 11 and motor 30 drives this sprocket through gearing 32, sprocket 33 and chain 34. Sprocket 31, in turn, drives chain 17 through shaft 11 and sprocket 15.

Referring now more particularly to FIG. 3, the device A is located near an overhead conveyor system indicated at B. The conveyor has a track along which the animal carcasses move forward in the direction of the arrows past the station where the device A is located, and then onward, turning in another direction to be processed in other packing house operations. A channel or pit 35 is provided into which the lower portion of the chain 17 may extend.

A platform 36 is built alongside the conveyor, and the operator stands upon this platform to perform the hide removing operation utilizing the improved apparatus. Frame 10 of apparatus A is also anchored and made secure with the platform 36 through the frameword 37.

We come now to the holder device B. This device may take any suitable form, but as shown in the drawings is a cylindrical drum 40 with a roughened or grooved surface. Drum 40 has its ends secured to frame members 41 and 42 which are in turn secure with platform 36. Thus drum 35 is stationary and does not turn.

OPERATION

The operation of my improved process, utilizing the improved apparatus as illustrated, may, as an example, take place as follows:

The carcasses such as lambs from the killing floor are suspended with shackles by their hind legs on the conveyor B where they hang, head down and with their hides still in tact. The carcasses are spaced to permit operators with skinning knives to start the skinning fuctions as the carcasses pass their stations. First an operator may hand-skin the heel and shank portions bringing the loose skin down below the tail and the buttocks of the carcass. The belly portion of the hide may also be slit down the center. This produces a loose end portion of the hide from the hind of the carcass.

An operator, standing on platform 36, grasps this loose hide portion of the carcass approaching his station, places it over the drum 40, and holds it there with his hands. Since chain 17 is in constant operation driven by motor 30 it is but a second until one of the arms 20 is lowered by chain 17 to bring its roller 21 against the hide at a point between the carcass and drum 40.

For explanation as to what takes place at this time please refer to FIG. 5. The end portion of the hide is held by drum 40 while the operator holds this end portion of the hide in contact with the drum. Then the arm 20 descends and the roller 21 of arm 20 comes into contact with the inner side of the hide. The roller, at its point of contact with the hide, is at the position shown at 21a in FIG. 5. The roller of arm 20 extends lengthwise toward the viewer as seen in FIG. 5, and parallel with the track of the conveyor B, and parallel also with the axis of drum 40 of the holder device C. As shown by the drawings, it is preferable that the roller strike the hide at about the center between drum 40 and the flesh of the carcass. The roller should at all times be spaced from the flesh of the carcass for sanitary as well as mechanical reasons.

As the arm 20 moves downwardly in a vertical plane parallel with the conveyor track, the roller comes to the position indicated at 21b and later to the position indicated at 21c. Since the distance from drum 40 to 21c is substantially greater than the distance from drum 40 to 21a and the roller 21 is free to roll, it will in fact roll along the hide at the same time producing a greater dip or sag in the hide.

As arm 20 moves downwardly against the hide the juncture between the hide and the flesh of the carcass also moves downwardly beginning at $x$, moving to $y$ and later to $z$. When point $z$ has been reached either the pulling may be continued to sever the hide completely or the operator may then release his hold on the hide portion over drum 40 allowing the separated hide to follow the head of the carcass and be later severed therefrom.

The removal of the hide may be facilitated also by the forward movement of the conveyor which may, especially during the latter part of the period of hide removal, serve to move the carcass forward somewhat to lengthen the distance between the drum and the carcass and so hasten the removal of the hide.

During the time when the hide is being removed, the hide is pulling the carcass toward the drum and about its point of suspension on the conveyor. This is of no consequence so long as the point or line of removal from the carcass flesh is spaced from the arm 20 and its roller 21. The drum 40, as previously explained, is stationary and tension in the hide at this point causes the drum to hold on even more tightly along the whole top area of the drum, thus avoiding tearing or ripping of the hide at any point.

It is understood that many modifications may be made in the structure herein disclosed and that equivalent structures may be substituted for that described herein without departing from the inventive principles involved; and it is, therefore, intended that all such modifications and equivalents be covered as they are embraced within the spirit and the scope of the invention.

I claim:

1. A process for removing the hide from an animal carcass including the steps of suspending the carcass by its hind legs on a conveyor which is adapted for movement in a horizontal direction, removing the hide from a hind portion of the carcass, placing the portion of the hide so removed over an elongated horizontally extending holder with the end of said portion extending downwardly from said holder, pressing said hide portion against said holder while pressing downwardly on said hide at a point between said holder and the flesh of the carcass from which the hide is being removed, and continuing said pressing until the hide is substantially removed from said carcass.

2. A method as set forth in claim 1 including the step of moving said carcass on said conveyor while said pressing step is continued to thereby further increase the distance between said holder and the points at which said hide is being removed from said carcass.

3. A method as set forth in claim 1 in which said downward pressing is performed by passing a roller in an orbit in which said roller is passed downwardly to press said hide, then turned and passed upwardly, then turned about and passed downwardly into position for pressing the hide from another carcass.

* * * * *